US009361048B2

(12) United States Patent  
Ono

(10) Patent No.: US 9,361,048 B2  
(45) Date of Patent: *Jun. 7, 2016

(54) DEVICE MANAGEMENT APPARATUS AND DEVICE MANAGEMENT METHOD FOR MANAGING DEVICE SETTINGS

(71) Applicant: RICOH COMPANY, LTD., Tokyo (JP)

(72) Inventor: Takayuki Ono, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/811,908

(22) Filed: Jul. 29, 2015

(65) Prior Publication Data

US 2015/0331645 A1  Nov. 19, 2015

Related U.S. Application Data

(63) Continuation of application No. 14/226,922, filed on Mar. 27, 2014, now Pat. No. 9,122,427.

(30) Foreign Application Priority Data

Apr. 23, 2013 (JP) ................................. 2013-090271

(51) Int. Cl.
*G06F 3/12* (2006.01)
*G06K 15/00* (2006.01)

(52) U.S. Cl.
CPC ............ *G06F 3/1204* (2013.01); *G06F 3/1225* (2013.01); *G06F 3/1232* (2013.01); *G06F 3/1285* (2013.01); *H04N 2201/0094* (2013.01)

(58) Field of Classification Search
CPC ... G06F 3/1204; G06F 3/1285; G06F 3/1293; G06F 3/1232; G06F 3/1225; H04N 1/00344; H04N 1/00278

USPC ............ 358/1.15, 1.13, 1.14, 1.1, 1.16, 1.18, 358/1.17; 715/744, 745, 747, 750
See application file for complete search history.

(56) References Cited

U.S. PATENT DOCUMENTS

| 7,587,476 | B2 | 9/2009 | Sato | |
| 2007/0185979 | A1* | 8/2007 | Yoshida | G06F 3/1204 709/220 |
| 2009/0046318 | A1 | 2/2009 | Sakikawa | |
| 2009/0201551 | A1 | 8/2009 | Uchida | |
| 2010/0007905 | A1* | 1/2010 | Murashita | G06F 3/1205 358/1.13 |
| 2012/0069369 | A1 | 3/2012 | Hagiwara | |
| 2013/0155451 | A1* | 6/2013 | Nakahara | G06F 3/1204 358/1.15 |
| 2014/0139871 | A1* | 5/2014 | Igarashi | H04N 1/00344 358/1.15 |
| 2014/0149563 | A1 | 5/2014 | Ono | |

FOREIGN PATENT DOCUMENTS

JP  2012-084124  4/2012

* cited by examiner

*Primary Examiner* — Gabriel Garcia
(74) *Attorney, Agent, or Firm* — IPUSA, PLLC

(57) ABSTRACT

A device management system includes a determining unit that acquires from a storage unit information relating to a setting of a first device and information relating to a setting of a second device, compares the acquired information, and determines whether the setting of the second device satisfies the setting of the first device; a selecting unit that is used when the determining unit determines that the setting of the second device does not satisfy the setting of the first device and is configured to select at least one device that is capable of satisfying the setting of the first device based on information relating to a setting of the at least one device stored in the storage unit; and an applying unit that applies to the at least one device selected by the selecting unit a setting value set up for the setting of the first device.

6 Claims, 12 Drawing Sheets

NEW DEVICE REGISTRATION

NEW REGISTRATION — 511
REPLACEMENT — 512

CONTROL NUMBER: A-0001
INTRODUCTION DATE/TIME: 1999/03/31

ADMINISTRATOR: TARO YAMADA
DISPOSAL DATE/TIME: ———

| ITEM | VALUE |
|---|---|
| CONTROL NUMBER | A-0001 |
| ADMINISTRATOR | TARO YAMADA |
| MODEL NAME | AB111C |
| LOCATION | OFFICE A 11F |
| IP ADDRESS | 111.111.111.111 |
| MAC ADDRESS | 11-11-11-11-11-11 |
| SERIAL NUMBER | A123456789 |
| PRICE | ¥1,000,000 |
| INTRODUCTION DATE/TIME | 1999/03/31 |
| DISPOSAL DATE/TIME | 2011/11/30 |

FIG.7

| | MODEL NAME | LOCATION | IP ADDRESS | MAC ADDRESS | SERIAL NUMBER | INTRODUCTION DATE/TIME | DISPOSAL DATE/TIME |
|---|---|---|---|---|---|---|---|
| ○ | AB111C | OFFICE A 11F | 111.111.111.111 | 11-11-11-11-11-11 | A123456789 | 1999/03/31 | 2011/11/30 |
| ● | AC222C | OFFICE B 3F 302 | 11.11.11.11 | 22-22-22-22-22-22 | A987654321 | 2003/08/17 | 2011/11/30 |
| ○ | BA333D | OFFICE A 5F ROOM C | 123.123.123.123 | 33-33-33-33-33-33 | B543256789 | 2002/02/02 | 2010/09/10 |

| ITEM | VALUE |
| --- | --- |
| DEVICE ID | 001 |
| MODEL NAME | AB111C |
| IP ADDRESS | 111.111.111.111 |
| SERIAL NUMBER | A123456789 |
| MAC ADDRESS | 11-11-11-11-11-11 |
| LOCATION | OFFICE A 11F |
| REGISTRATION DATE/TIME | 2000/04/01 |
| DISPOSAL DATE/TIME | 2011/11/30 |
| SETTING ID | 123 |
| : | : |
| APPLICATION ID | 456 |
| : | : |
| SETTING ID | 123 |
| SETTING NAME | SSL COMMUNICATION |
| SETTING VALUE | ON |
| : | : |
| APPLICATION ID | 456 |
| APPLICATION NAME | Application123 |
| VERSION | 1.0.1 |
| SERIAL NUMBER | D1122334 |
| : | : |

Rows grouping:
- BASIC INFORMATION: DEVICE ID through APPLICATION ID
- SETTING INFORMATION: SETTING ID, SETTING NAME, SETTING VALUE
- APPLICATION INFORMATION: APPLICATION ID, APPLICATION NAME, VERSION, SERIAL NUMBER

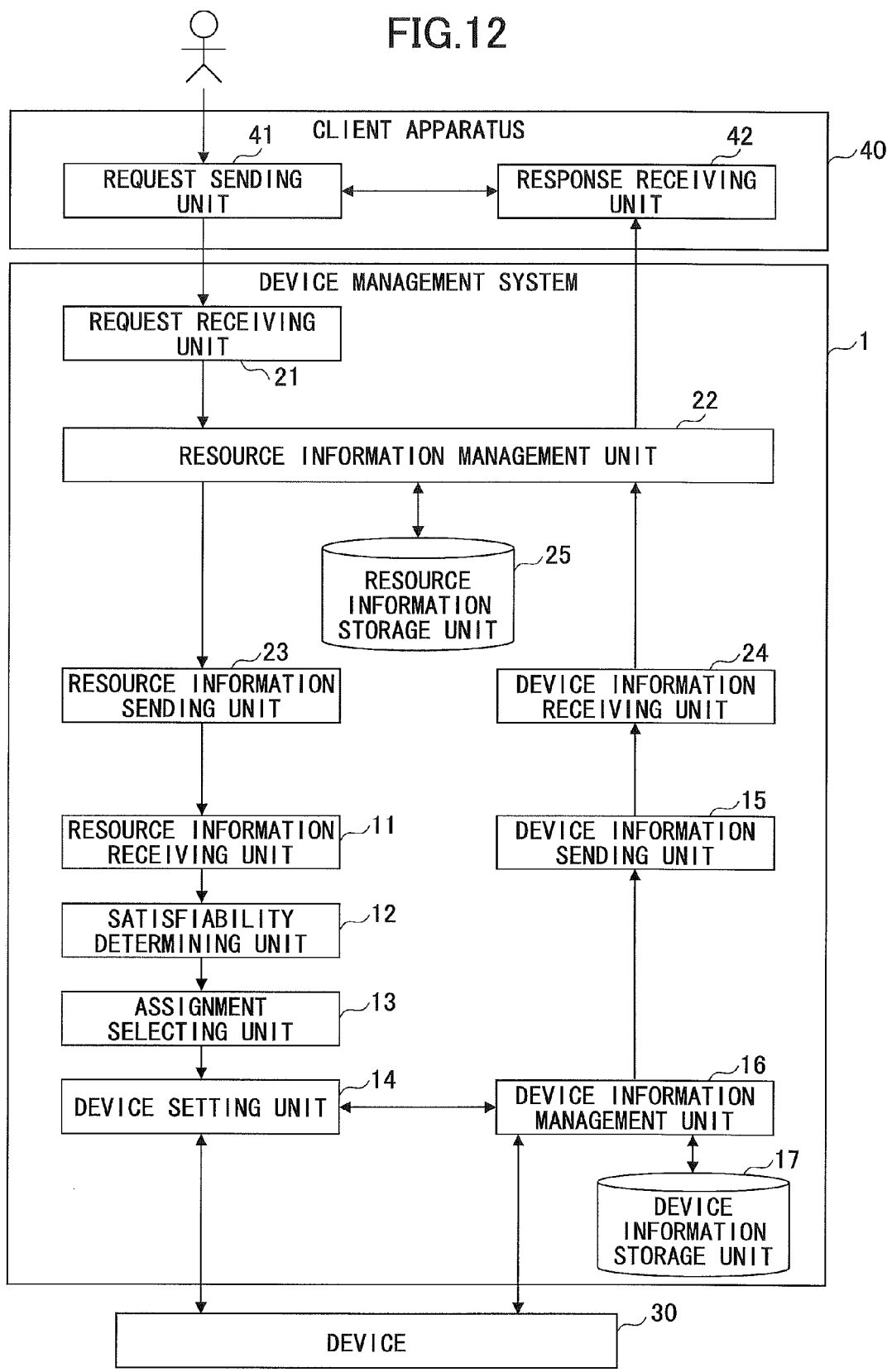

DEVICE MANAGEMENT APPARATUS AND DEVICE MANAGEMENT METHOD FOR MANAGING DEVICE SETTINGS

CROSS-REFERENCE TO RELATED APPLICATION

The present application is a continuation application and claims priority under 35 U.S.C. 120 to U.S. patent application Ser. No. 14/226,922 filed on Mar. 27, 2014, which has been issued as U.S. Pat. No. 9,122,427, which claims priority under 35 U.S.C. 119 to Japanese Patent Application No. 2013-090271 filed on Apr. 23, 2013. The entire contents of the foregoing applications are incorporated herein by reference.

BACKGROUND OF THE INVENTION

1. Field of the Invention

The present invention relates to a device management apparatus, an information processing system, and an information processing method.

2. Description of the Related Art

In corporate environments, devices such as multifunction peripherals and printers are sometimes replaced by new devices. In other words, previous devices are disposed and newly purchased devices are used instead. Techniques are known for detecting activities such as installation, movement, addition, change, or disposal (IMACD) performed with respect to devices and managing the devices accordingly (see e.g., Japanese Laid-Open Patent Publication No. 2012-084124).

In recent years, electronic devices such as multifunction peripherals and printers are able to have their capabilities expanded by altering values of various settings or installing application programs, for example, to accommodate user operations.

When such electronic devices are replaced by new devices, users may wish to continue using the capabilities of the previous devices (i.e., devices to be replaced, also referred to as "pre-replacement devices" hereinafter) in the new devices (also referred to as "replacement devices" hereinafter). In such case, the users have to repeat the same setting and program installation operations performed with respect to the previous devices on the new devices. The need to perform such operations may impose a large burden on users, particularly those managing a large number of devices.

Also, there may be cases where a replacement device (new device) cannot assume (satisfy) all the functions of the pre-replacement device (previous device).

Thus, there is a demand for improving efficiency of setting operations to be performed with respect to a device.

SUMMARY OF THE INVENTION

According to one embodiment of the present invention, a device management system includes a determining unit that acquires from a storage unit information relating to a setting of a first device and information relating to a setting of a second device, compares the acquired information, and determines whether the setting of the second device satisfies the setting of the first device; a selecting unit that is used in a case where the determining unit determines that the setting of the second device does not satisfy the setting of the first device and is configured to select at least one device that is capable of satisfying the setting of the first device based on information relating to a setting of the at least one device stored in the storage unit; and an applying unit that applies to the at least one device selected by the selecting unit a setting value set up for the setting of the first device.

According to an aspect of the present invention, setting operations for a device may be performed more efficiently.

BRIEF DESCRIPTION OF THE DRAWINGS

FIG. 5 illustrates an exemplary new device registration screen;

FIG. 6 is a table illustrating an exemplary data structure of resource information;

FIG. 7 illustrates an exemplary disposed device list screen;

FIG. 8 illustrates an exemplary data structure of device information;

FIG. 12 is a block flow diagram illustrating an exemplary functional configuration of an information processing system according to an alternative embodiment of the present invention.

DETAILED DESCRIPTION OF THE PREFERRED EMBODIMENTS

In the following, certain illustrative embodiments of the present invention are described with reference to the accompanying drawings.

Figure 1:
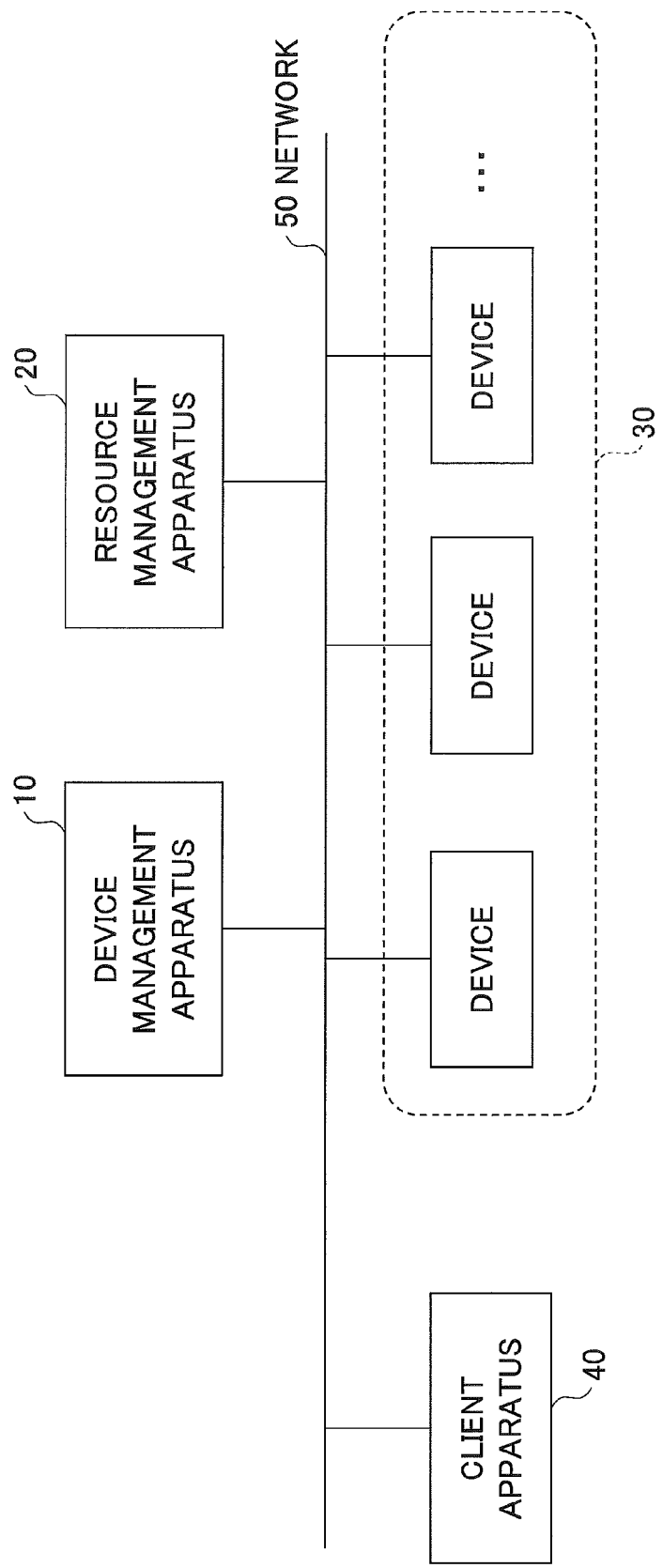
FIG. 1 is a block diagram illustrating an exemplary configuration of an information processing system according to an embodiment of the present invention.

FIG. 1 is a block diagram illustrating an exemplary configuration of an information processing system according to an embodiment of the present invention. The information processing system illustrated in FIG. 1 includes a device management apparatus 10, a resource management apparatus 20, a plurality of devices 30, and a client apparatus 40 that are connected via a network 50 such as a Local Area Network (LAN) or a Wide Area Network (WAN).

The device 30 may be an image forming apparatus such as a multifunction peripheral, a copying machine, a scanner, or a printer, for example. The device 30 may also be an electronic device other than an image forming apparatus such as a projector, an electronic white board, a teleconference system, or a digital camera, for example.

The device management apparatus 10 is a computer capable of performing a batch operation for setting up setting information for each device 30, for example. Note that in the following descriptions, a setting of the setting information may also be referred to as "item" and a value set up for the setting may be referred to as "setting value". The device management apparatus 10 stores information including attribute information of the device 30 and setting information set up for the device 30, for example (hereinafter, referred to as "device information"). The setting information may include setting values set up for various settings of the device 30 and application programs installed in the device 30, for example. That is, in the present embodiment, a setting operation for setting up setting information in the device 30 includes the installation of an application program in the device 30. The resource management apparatus 20 is a computer that manages resource information of each device 30. The resource information may be information necessary for general resource management, for example. In the present embodiment, the resource information includes attribute information of the device 30 and information indicating a status of the devices 30 as a resource such as information indicating the usage status of the device 30. The "information indicating the usage status" means information indicating whether the device is still used. An example of the "information indicating the usage status" may be information indicating whether the device has been disposed. Note that the resource management apparatus 20 may also manage resource information of resources other than the device 30. For example, the resource management apparatus 20 may also manage resource information of software.

The client apparatus 40 is an information processing apparatus that acts as a user interface of the device management apparatus 10 and the resource management apparatus 20. That is, a user may input a request to the device management apparatus 10 or the resource management apparatus 20 via the client apparatus 40. Examples of the client apparatus 40 include a personal computer (PC), a tablet terminal, a smartphone, or a mobile phone.

Figure 2:
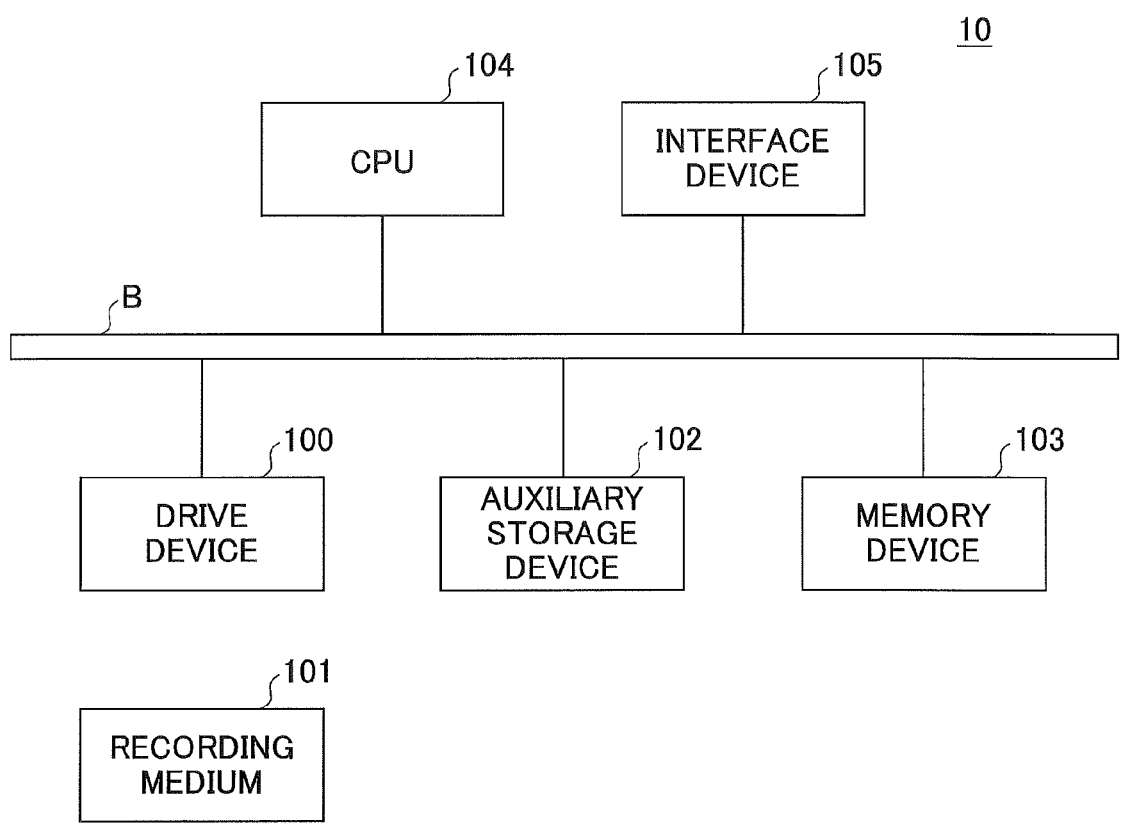
FIG. 2 is a block diagram illustrating an exemplary hardware configuration of a device management apparatus according to an embodiment of the present invention.

FIG. 2 is a block diagram illustrating an exemplary hardware configuration of the device management apparatus 10 of the present embodiment. In FIG. 2, the device management apparatus 10 includes a drive device 100, an auxiliary storage device 102, a memory device 103, a CPU 104, and an interface device 105 that are interconnected via a bus B.

A program for implementing a process of the device management apparatus 10 may be stored in a recording medium 101 such as a CD-ROM. When the recording medium 101 storing the program is loaded into the drive device 100, the program may be installed in the auxiliary storage device 102 from the recording medium 101 via the drive device 100, for example. However, the program does not necessarily have to be installed from the recording medium 101 but may instead be downloaded from another computer via the network 50, for example. The auxiliary storage device 102 stores the installed program and other necessary files and data, for example.

The memory device 103 reads the program from the auxiliary storage device 102 and stores the program upon receiving an instruction to start the program, for example. The CPU 104 executes the program stored in the memory device 103 to implement a function of the device management apparatus 10. The interface device 105 is used as an interface to establish connection with the network 50.

Note that the device management apparatus 10 may be implemented by one or more computers. The resource management apparatus 20 may have a hardware configuration similar to that illustrated in FIG. 2 and may be implemented by one or more computers. Further, the device management apparatus 10 and the resource management apparatus 20 may be integrally implemented by one or more computers, for example.

Figure 3:
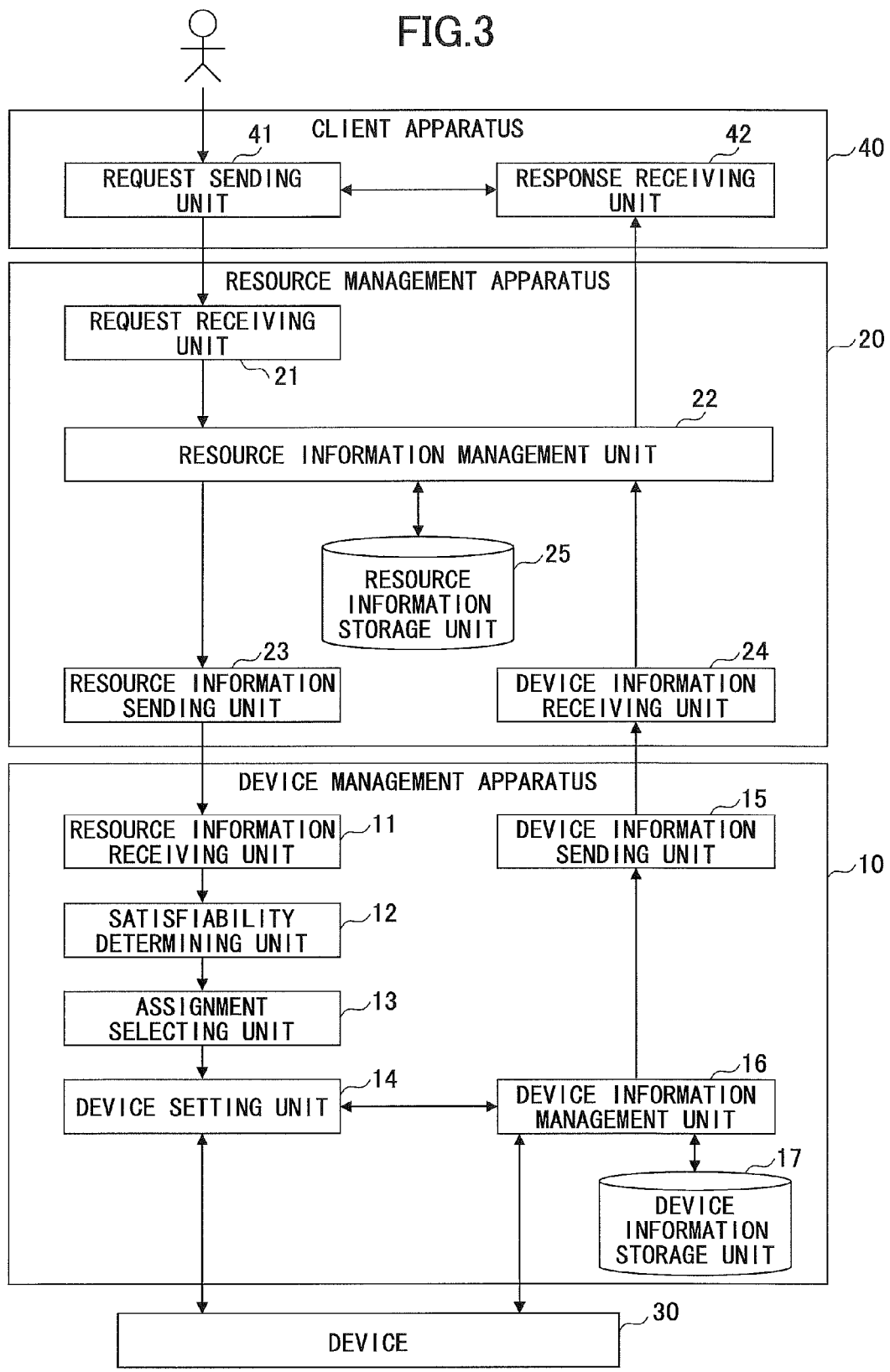
FIG. 3 is a block flow diagram illustrating exemplary functional configurations of apparatuses in a first embodiment of the present invention.

FIG. 3 is a block flow diagram illustrating exemplary functional configurations of the apparatuses of the information processing system according to a first embodiment.

In FIG. 3, the client apparatus 40 includes a request sending unit 41 and a response receiving unit 42. The request sending unit 41 sends a process request to the resource management apparatus 20 in response to an operation by a user, input via an input device such as a mouse, a keyboard, a button, or a touch panel, for example. The response receiving unit 42 receives a response including an execution result of the process executed in the resource management apparatus 20 in response to the process request. The response receiving unit 42 displays information included in the response on a display device such as a liquid crystal display, for example.

The resource management apparatus 20 includes a request receiving unit 21, a resource information management unit 22, a resource information sending unit 23, and a device information receiving unit 24. These units may be implemented by a CPU of the resource management apparatus 20 executing a program installed in the resource management apparatus 20. The resource management apparatus 20 further includes or uses a resource information storage unit 25. The resource information storage unit 25 may be implemented by an auxiliary storage device of the resource management apparatus 20, or a storage device connected to the resource management apparatus 20 via the network 50, for example.

The request receiving unit 21 receives the process request from the client apparatus 40. The resource information management unit 22 controls the execution of a process in accordance with the process request from the client apparatus 40. For example, the resource information management unit 22 may acquire resource information from the resource information storage unit 25 or register resource information in the resource information storage unit 25. Further, the resource information management unit 22 returns a response to the process request to the client apparatus 40.

The resource information storage unit 25 stores the resource information of the devices 30. The resource information sending unit 23 sends the resource information to the device management apparatus 10. The device information receiving unit 24 receives device information from the device management apparatus 10.

The device management apparatus 10 includes a resource information receiving unit 11, a satisfiability determining unit 12, an assignment selecting unit 13, a device setting unit 14, a device information management unit 15, and a device information sending unit 16. These units may be implemented by the CPU 104 executing a program installed in the device management apparatus 10. The device management apparatus 10 further includes or uses a device information storage unit 17. The device information storage unit 17 may be implemented by the auxiliary storage device 102, or a storage device connected to the device management apparatus 10 via the network 50, for example.

The resource information receiving unit 11 receives the resource information sent from the resource management apparatus 20. In the present embodiment, the resource information receiving unit 11 receives resource information of the device 30 that is to be replaced (pre-replacement device) and resource information of the device 30 that is to be a replacement for the pre-replacement device (replacement device).

The satisfiability determining unit 12 determines whether settings of the replacement device can satisfy settings of the pre-replacement device. Note that a setting of a device 30 refers to a setting that can be set up with respect to the device 30. Also, the settings of the replacement device satisfying the settings of the pre-replacement device may refer to a case where the settings of the replacement device completely match the settings of the pre-replacement device, or a case where the settings of the replacement device include the settings of the pre-replacement device.

Note that a setting of the device 30 is closely associated with a function of the device 30. That is, the setting of the device 30 may vary depending on the function of the device 30. Accordingly, determining whether the settings of the replacement device can satisfy the settings of the pre-replacement device may be substantially synonymous with determining whether the functions of the replacement device satisfy the functions of the pre-replacement device.

In a case where the satisfiability determining unit 12 determines that the settings of the replacement device cannot satisfy the settings of the pre-replacement device, the assignment selecting unit 13 selects a device 30 to which an unsatisfied setting of the pre-replacement device is to be assigned (also referred to as "assigning device" hereinafter). In this way, settings included in the setting information of the pre-replacement device may be satisfied by one or more devices 30.

The device setting unit 14 applies the setting information set up in the pre-replacement device to the replacement device and the assigning device, for example. The device information management unit 15 acquires device information from the device information storage unit 17 or registers device information in the device information storage unit 17, for example. The device information sending unit 16 sends device information to the resource management apparatus 20. The device information storage unit 17 stores device information of the devices 30.

Figure 4:
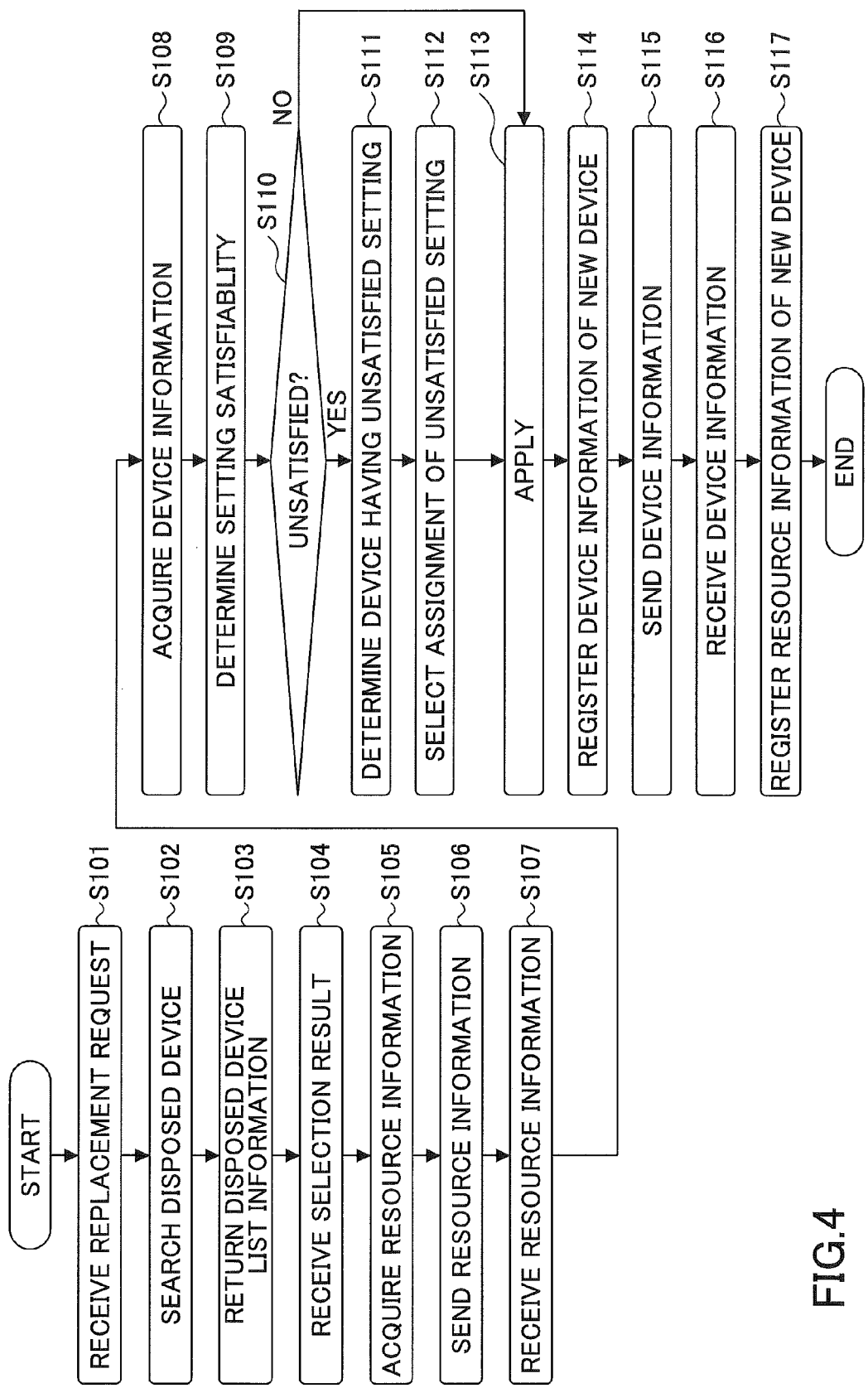
FIG. 4 is a flowchart illustrating exemplary process steps executed by a device management apparatus and a resource management apparatus in the first embodiment.

In the following, process steps executed by the device management apparatus 10 and the resource management apparatus 20 are described. FIG. 4 is a flowchart illustrating exemplary process steps executed by the device management apparatus 10 and the resource management apparatus 20 in the first embodiment.

In step S101, the request receiving unit 21 of the resource management apparatus 20 receives a replacement request for replacing a device 30 from the client apparatus 40. The client apparatus 40 may receive a replacement command for replacing the device 30 from a user and send the replacement request for replacing the device 30 to the resource management apparatus 20 according to the replacement command.

For example, the client apparatus 40 may display a screen (hereinafter, referred to as "new device registration screen") for registering resource information of a newly installed device 30 (hereinafter, referred to as a "new device") and accept an input of a replacement command for replacing a device 30 via the new device registration screen.

FIG. 5 illustrates an exemplary new device registration screen 510 that may be displayed at the client apparatus 40. Values for various information items of resource information of the new device may be input via the new device registration screen 510 of FIG. 5. Note that in FIG. 5, some information items of the resource information are omitted to simplify the illustration. The information items of the resource information are described in detail below.

The new device registration screen 510 includes a new registration button 511, a replacement button 512, and fields for entering corresponding values for the information items of the resource information. The new registration button 511 is for accepting a new registration command for registering resource information input via the new device registration screen 510. The replacement button 512 is for accepting a replacement command. Note that replacement refers to replacing a given device 30 (pre-replacement device) with a new device that is having its resource information newly registered in the resource management apparatus 20. That is, in the present embodiment, the new device is an example of a replacement device. Note that replacement in the present embodiment also involves having the replacement device inherit the setting information of the pre-replacement device.

When the replacement button 512 is pressed, the client apparatus 40 sends a replacement request for replacing a device 30 to the request receiving unit 21 of the resource management apparatus 20, and in this way, the resource management apparatus 20 receives the replacement request in step S101 of FIG. 4. Note that the replacement request for replacing the device 30 includes the resource information of the new device that had been input via the new device registration screen 510. Also, the replacement request for replacing the device 30 includes a registration request for registering the resource information of the new device.

The request receiving unit 21 stores the received resource information of the new device in a memory device of the resource management apparatus 20, for example. Alternatively, the resource information may be stored in the resource information storage unit 25 at this point.

Then, in step S102, the resource information management unit 22 searches the resource information storage unit 25 for resource information of one or more disposed devices 30.

FIG. 6 illustrates an exemplary data structure of resource information. Note that FIG. 6 illustrates resource information of one device 30 (i.e., one record registered in the resource information storage unit 25). The resource information includes corresponding values for various information items of the resource information. The information items of the resource information may include, for example, control number, administrator, model name, location, IP address, MAC address, serial number, price, introduction date/time, and disposal date/time.

The "control number" represents a number allocated to the device 30 as a resource. The "administrator" represents the name of an administrator of the device 30. The "model name" represents the model name of the device 30. The "location" represents the place where the device 30 is installed. The "IP address", "MAC address" and "serial number" respectively represent the IP address, the MAC address and the serial number of the device 30. The "price" represents the purchase price of the device 30. The "introduction date/time" represents the date/time the device 30 was introduced. The "disposal date/time" represents the date/time the device 30 was disposed. Note that whether the device 30 is still used may be determined based on the disposal date/time. That is, when the resource information of the device 30 does not include a value for the disposal date/time, it may be determined that the device 30 is still used. The disposal date/time is an example of information indicating the usage status of the device 30. In other examples, an information item explicitly indicating the usage status of the device 30 may be included in the resource information. Note that in the new device registration screen 510 of FIG. 5, values may be input for all information items except for the disposal date/time, for example.

Referring back to FIG. 4, in step S102, the resource information management unit 22 searches the resource information storage unit 25 for resource information of disposed devices 30. That is, the resource information management unit 22 searches for records of resource information having values set up for the item "disposal date/time". Then, in step S103, the resource information management unit 22 returns a list of the resource information of the disposed devices 30 to the client apparatus 40.

Upon receiving the list of resource information of the disposed devices 30, the response receiving unit 42 of the client apparatus 40 displays a screen including the list (referred to as "disposed device list screen" hereinafter) on the display device of the client apparatus 40. That is, the list of disposed devices 30 is displayed at the client apparatus 40.

FIG. 7 illustrates an exemplary disposed device list screen 530. The disposed device list screen 530 of FIG. 7 includes a list of resource information of the disposed devices 30. The list includes radio buttons 531 for enabling selection of one of the disposed devices 30 from the list.

The user operates the radio buttons 531 to select one of the disposed devices 30 to be replaced by the new device 30 designated via the new device registration screen 510 illustrated in FIG. 5. After one of the disposed devices 30 is selected and an OK button 532 is pressed, the request sending unit 41 of the client apparatus 40 sends identification information of the selected disposed device 30 (pre-replacement device) to the resource management apparatus 20. The identification information of the pre-replacement device is information enabling identification of the selected disposed device 30, such as the control number, the IP address, the MAC address, or the serial number of the selected disposed device 30, for example. Note that in some embodiments the entire resource information of the selected disposed device 30 may be sent.

In step S104, the request receiving unit 21 of the resource management apparatus 20 receives the identification information of the disposed device 30 selected at the client apparatus 40. Then, in step S105, the resource information management unit 22 acquires the resource information of the selected disposed device 30 from the resource information storage unit 25 based on the identification data. Note that if the entire resource information of the selected disposed device 30 is sent from the client apparatus 40, this step may be omitted. Then, in step S106, the resource information sending unit 23 sends the replacement request including the resource information of the selected disposed device 30 and the resource information of the new device 30 stored in the memory device of the resource management apparatus 20, for example, to the device management apparatus 10.

In step S107, the resource information receiving unit 11 of the device management apparatus 10 receives the replacement request including the resource information of the selected disposed device 30 and the resource information of the new device 30. Then, in step S108, the device information management unit 15 acquires device information of the selected disposed device 30 (pre-replacement device) and device information of the new device from the device information storage unit 17.

FIG. 8 is a table illustrating an exemplary data structure of device information. Note that FIG. 8 illustrates exemplary device information of one device 30 (i.e., one record registered in the device information storage unit 17). The device information includes basic information, setting information, and application information.

The basic information is basic information of the device 30, and may include information items such as device ID, model name, IP address, serial number, MAC address, location, registration date/time, disposal date/time, setting ID, and application ID, for example.

The "device ID" is identification information for identifying each of the devices 30 at the device management apparatus 10. The "model name", the "IP address", the "serial number", the "MAC address" and the "location" represent information identical to the information items of the resource information with the same names. The "registration date/time" represents the date/time the device information was registered in the device information storage unit 17. For example, when the device management apparatus 10 detects a device 30 by searching the network 50, device information of the detected device 30 is automatically registered in the device information storage unit 17. The "disposal date/time" represents the date/time the device management apparatus 10 ceases to detect the presence of the device 30. For example, the device management apparatus 10 may conduct a search for the devices 30 connected to the network 50 at predetermined time intervals. The device management apparatus 10 may store a disposal date/time for a device 30 that is not detected for a predetermined period of time, or a device 30 that fails to be detected a consecutive number of times, for example.

The "setting ID" is identification information for identifying a setting of the device 30. The number of setting IDs included in the basic information corresponds to the number of settings that may be set up for the device 30. The "application ID" is identification information for identifying an application program installed in the device 30. The number of application IDs included in the basic information corresponds to the number of application programs installed in the device 30.

The "setting information" is detailed information on a setting of the device 30, and includes information items such as setting ID, setting name, and setting value for each setting. The "setting ID" is identification information for identifying a setting of the device 30. The setting ID included in the basic information corresponds to link information that establishes a link to the corresponding setting ID included in the setting information. The "setting name" represents the name of the setting. The "setting value" represents a value set up for the setting. Note that a value set up for a setting is not limited to a single value such as a single character string or a single numeric value. For example, in some cases, a database such as an address book may be set up as the setting value for a setting. An address book refers to a type of database that may include address information of each user corresponding to a transmission destination candidate for transmitting data handled by the device 30, for example.

The "application information" is detailed information on the application programs installed in the device 30, and includes information items such as application ID, application name, version, and serial number for each of the application programs. The "application ID" is identification information for identifying the application program. The application ID included in the basic information corresponds to link information establishing a link to the corresponding application ID included in the application information. The "application name" represents the name of the application program. The "version" represents the version of the application program. The "serial number" represents the serial number of the application program.

Referring back to FIG. 4, in step S108, the device information management unit 16 acquires device information of the pre-replacement device and the device information of the new device by searching the device information storage unit 17 for device information with the same serial numbers as those included in the resource information of the pre-replacement device and the new device, for example. In another example, the MAC address may be used instead of the serial number to identify the device information corresponding to the resource information. Also, in an environment where the uniqueness of the IP address is ensured, the IP address may be used instead of the serial number. Further, a combination of two or more of the serial number, the MAC address, and the IP address may be used.

Then, in step S109, the satisfiability determining unit 12 compares the setting information of the new device and the setting information of the pre-replacement device, and determines whether the settings of the new device can satisfy the settings of the pre-replacement device. More specifically, the satisfiability determining unit 12 determines whether the group of setting IDs in the setting information of the new device includes the group of setting IDs in the setting information of the pre-replacement device. Note that inclusion encompasses a complete match of the setting information.

If the settings of the new device cannot satisfy the settings of the pre-replacement device (step S110, YES), in step S111, the assignment selecting unit 13 refers to the device information storage unit 17 to identify a device 30 (referred to as "assignment candidate device" hereinafter) that is capable of satisfying the setting of the pre-replacement device that cannot be satisfied by the settings of the new device (unsatisfied setting). More specifically, the assignment selecting unit 13 searches the device information storage unit 17 for device information including the setting ID of the unsatisfied setting. A device 30 associated with the device information including the unsatisfied setting searched out from the device information storage unit 17 corresponds to the assignment candidate device. Note that in the present embodiment, a plurality of devices 30 may be identified as the assignment candidate device.

Then, in step S112, the assignment selecting unit 13 selects from the one or more assignment candidate devices an assigning device to which the unsatisfied setting is to be assigned. Although the method of selection is not particularly limited, for example, a device 30 that is located closer to the location of the pre-replacement device may be given priority, or a device 30 with an IP address that is similar to the IP address of the pre-replacement device may be given priority in selecting the assigning device. Also, the selection may be made such that the number of devices 30 selected may be minimized, or the number of device 30 selected may be maximized, for example. In any case, one or more assigning devices are selected such that the settings of the selected assigning devices, combined together, can satisfy the unsatisfied setting.

Then, in step S113, the device setting unit 14 applies the setting information set up for the pre-replacement device to the new device and the one or more assigning devices.

Specifically, with respect to the settings of the pre-replacement device included in the settings of the new device, the setting values set up for the pre-replacement device are applied to the new device. With respect to the settings assigned to the assigning devices (settings of the pre-replacement device not included in the settings of the new device), the setting values set up for the pre-replacement device are applied to the corresponding assigning devices. Also, applying the setting information to the new device and the assigning devices may include installing application programs that were installed in the pre-replacement device in the new device or the assigning devices. That is, an application program installed in the pre-replacement device is also treated as a setting value for a setting in the present embodiment. The application program installed in the pre-replacement device may be installed in the new device or be distributed to the new device and the assigning devices, for example. In some embodiments, a determination may be made as to whether the application program can be installed in the new device or the assigning devices, and the device to which the application program can be installed may be selected as the installation destination of the application program. For example, the model name of a device that can support the application program may be included in the application information, and the determination of whether the application program can be installed in the new device or the assigning devices may be made based on the model name included in the application information. The application program to be installed may be stored in the auxiliary storage device 102 of the device management apparatus 10 or a storage device (not shown) connected to the device management apparatus 10 via the network 50, for example. Note that communication with the new device or the assigning devices may be established based on an IP address included in resource information designated by the replacement request, for example.

Figure 9:
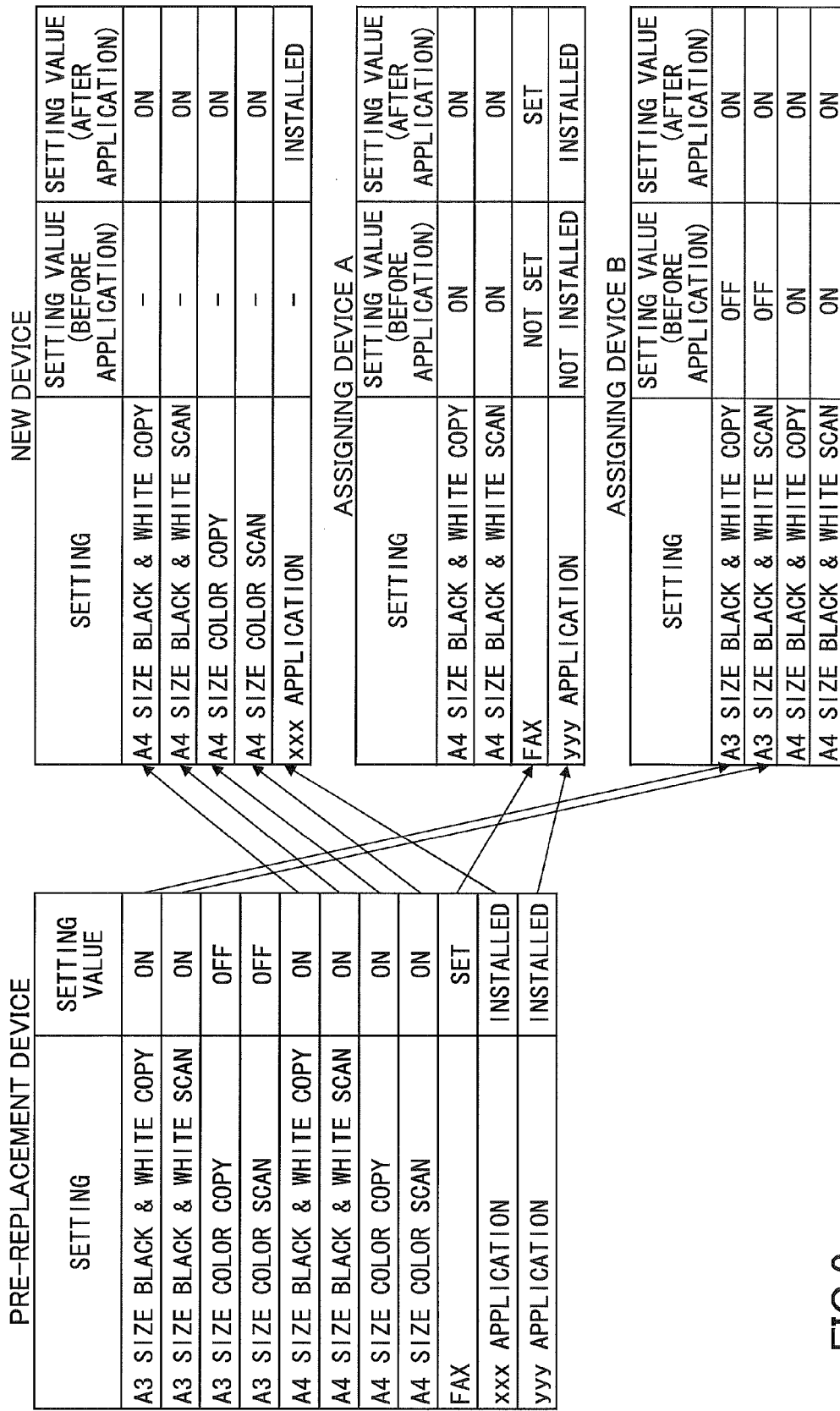
FIG. 9 illustrates an exemplary case of applying setting information of a pre-replacement device to a new device and assigning devices.

FIG. 9 illustrates an exemplary case of applying setting information of a pre-replacement device to a new device and assigning devices. FIG. 9 includes tables representing setting values for the settings of the pre-replacement device, the new device, an assigning device A, and an assigning device B. Note that the tables representing the settings of the new device, the assigning device A, and the assigning device B include setting values before application of the setting information of the pre-replacement device and setting values after application of the setting information of the pre-replacement device. Also, note that the assigning device A and the assigning device B are examples of the devices 30 selected as assigning devices by the assignment selecting unit 13.

In FIG. 9, arrows illustrate how the setting values set up for the pre-replacement device are distributed (applied) to the new device, the assigning device A, and the assigning device B.

Note that the settings illustrated in FIG. 9 relate to the validity of a function of the device 30. That is, a setting value may be set up to indicate that a function is valid (e.g., ON) or invalid (e.g., OFF). However, the present embodiment is not limited to such form of settings. In the illustrated example, only a setting value indicating that a function is valid ("ON" in FIG. 9) may be applied to (inherited by) the new device or the assigning device. Note that in FIG. 9, the setting values for the settings "A3 size color copy" and "A3 size color scan" are "OFF". Accordingly, these setting values are excluded from the setting values that are applied to the new device or the assigning devices.

Also, in FIG. 9, "xxx application" and "yyy application" represent exemplary application programs installed in the pre-replacement device.

Note that in the case where the settings of the new device can satisfy the settings of the pre-replacement device (step S110, NO), the setting values set up for the pre-replacement device are applied to the new device. In other words, application of the setting information to the assigning devices takes place only when one or more assigning device are selected (i.e., when steps S111 and S112 are executed).

Note that in some cases, the new device may be excluded from the devices 30 that inherit the setting information of the pre-replacement device. For example, in a case where the settings of the pre-replacement device and the settings of the new device have no common settings, all of the settings of the pre-replacement device correspond to unsatisfied settings. In such a case, the new device may not inherit any of the setting values of the pre-replacement device. The new device may also be excluded from inheriting the setting information of the pre-replacement device depending on the selection criteria employed for selecting the assigning devices. For example, in a case where the selection criteria calls for maximizing the number of assigning devices that is to inherit the setting information of the pre-replacement device, the new device may be excluded from inheriting any of the setting values of the pre-replacement device.

Next, in step S114, the device information management unit 15 registers in the device information storage unit 17 device information of the new device based on the result of applying the setting information by the device setting unit 14. The basic information of the device information of the new device may be derived from the resource information designated by the replacement request, or alternatively, the device information management unit 15 may send an inquiry to the new device to acquire the relevant information. Also, the setting information and the application information may be based on the application result of step S109. That is, setting information relating to the setting for which a setting value has been successfully set up and application information of an application program that has been successfully installed in the new device may be registered in the device information storage unit 17.

Also, in the case where the setting information of the pre-replacement device is applied to the assigning device, device information of the assigning device stored in the device information storage unit 17 may be updated according to the application of the relevant setting information.

Next, in step S115, the device information sending unit 16 sends the newly registered device information of the new device to the resource management apparatus 20. In step S116, the device information receiving unit 24 of the resource management apparatus 20 receives the device information. Then, in step S117, the resource information management unit 22 of the resource management apparatus 20 stores resource information of the new device associated with the received device information in the resource information storage unit 25. Note that the resource information of the new device to be stored in the resource information storage unit 25 in step S117 may correspond to the resource information input via the new device registration screen 510 illustrated in FIG. 5. Alternatively, with respect to common settings of the device information and the resource information, the setting values of the device information may be extracted from the device information received in step S116, and the settings of the resource information may be updated by the extracted setting values.

As described above, according to an aspect of the first embodiment, the same setting information set up for the pre-replacement device may be automatically applied to the new device. Thus, in introducing the new device, a user may only have to perform setting operations with respect to settings that are different from those of the pre-replacement device. As a result, a setting operation with respect to the new device 30 may be efficiently performed.

Also, because the same setting information set up for the pre-replacement device is automatically applied to the new device, the functions available at the pre-replacement device may have an improved chance of continuing to be available at the new device.

Also, in a case where the setting information of the pre-replacement device cannot be satisfied by the new device alone, the setting that cannot be satisfied by the new device may be assigned to another device 30. In this way, the functions available at the pre-replacement device may have an even higher chance of continuing to be available even after replacement of the pre-replacement device.

Note that although an exemplary case in which the resource management apparatus 20 receives a replacement request from the client apparatus 40 is described above, the replacement request may alternatively be received by the device management apparatus 10 and transferred from the device management apparatus 10 to the resource management apparatus 20, for example.

Also, in some embodiments, instead of having the user select the pre-replacement device, the pre-replacement device may be automatically selected based on the commonality of resource information with that of the new device. For example, the resource information management unit 22 may automatically select a device 30 with an IP address, a location, or a combination thereof matching the resource information of the new device as the pre-replacement device.

In the following, a second embodiment of the present invention is described. Note that aspects of the second embodiment that are different from those of the first embodiment are described below. Thus, it may be assumed that aspects of the second embodiment that are not particularly mentioned below may be the same as the first embodiment.

In the second embodiment, a replacement condition is set up beforehand in the resource management apparatus 20 by the user via the client apparatus 40. For example, a replacement condition setting screen as illustrated in FIG. 10 may be displayed at the client apparatus 40.

Figure 10:
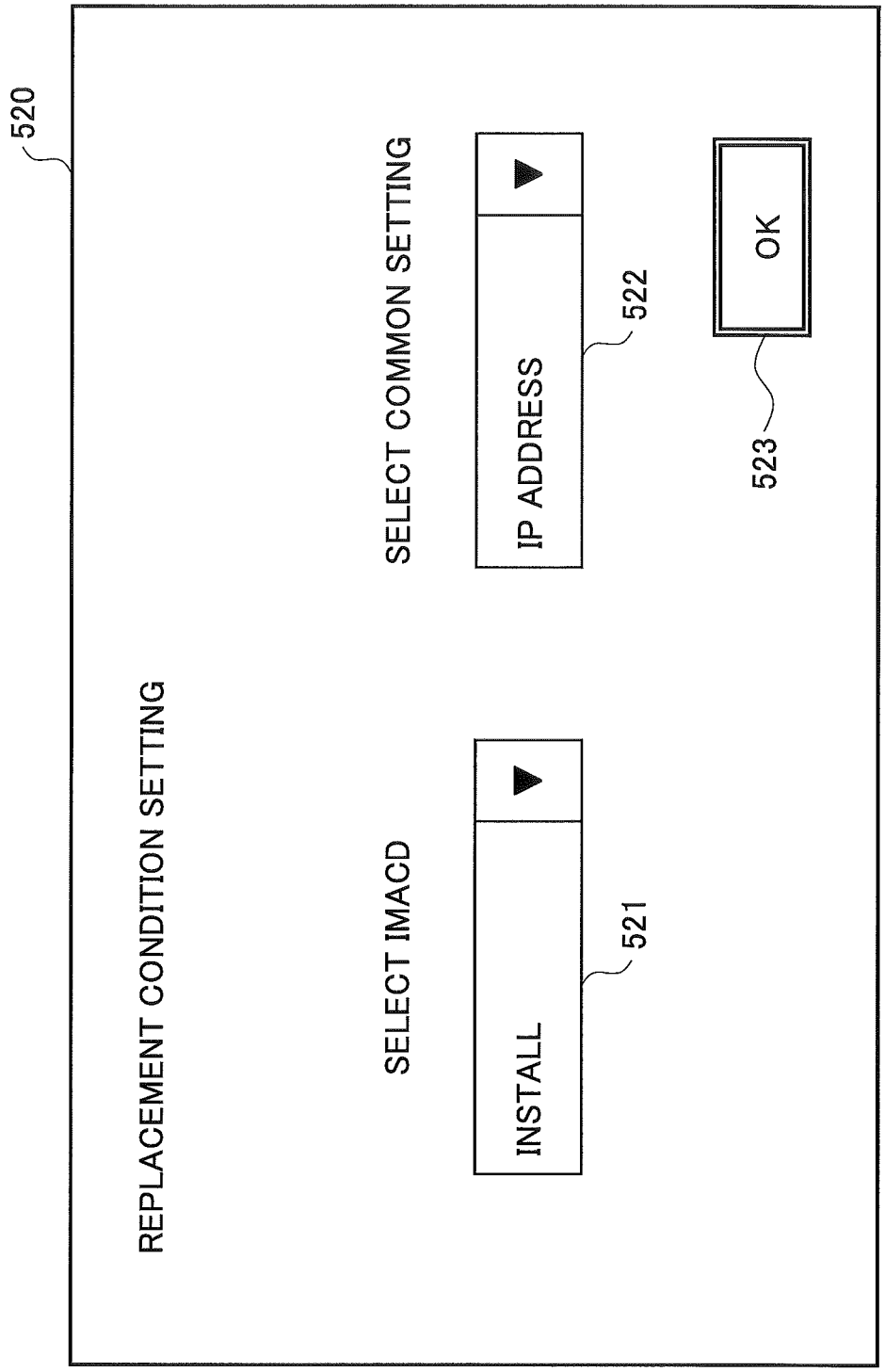
FIG. 10 illustrates an exemplary replacement condition setting screen.

FIG. 10 illustrates an exemplary replacement condition setting screen 520. In FIG. 10, the replacement condition setting screen 520 includes list boxes 521 and 522 and an OK button 523, for example. The list box 521 is a display component for enabling selection of a trigger for replacement. In the present embodiment, a trigger may be selected from activities including "Install", "Move", "Add", "Change" and "Disposal" (hereinafter, referred to as "IMACD"). FIG. 10 illustrates an example in which "install" is selected as the trigger for replacement. Here, "install" means installation of a device 30.

The list box 522 is a display component for enabling selection of a common setting between the new device 30 and the pre-replacement device 30. The common setting refers to an item of the resource information for which the setting value should be the same between the new device and the pre-replacement device. In FIG. 10, "IP address" is selected as the common setting.

Thus, FIG. 10 illustrates an exemplary case where a replacement condition is set up such that "when a new installation of a device 30 (new device) is detected, a disposed device with the same IP address as that of the new device is replaced by the new device".

When the OK button 523 is pressed at the replacement condition setting screen 520, the request sending unit 41 of the client apparatus 40 sends a registration request for registering the replacement condition to the resource management apparatus 20. The registration request includes the replacement condition set up at the replacement condition setting screen 520. The request receiving unit 21 of the resource management apparatus 20 may store the replacement condition in the auxiliary storage device of the resource management apparatus 20, for example.

In the following, process steps that may be executed in the case where the above-described replacement condition is set up beforehand are described.

Figure 11:
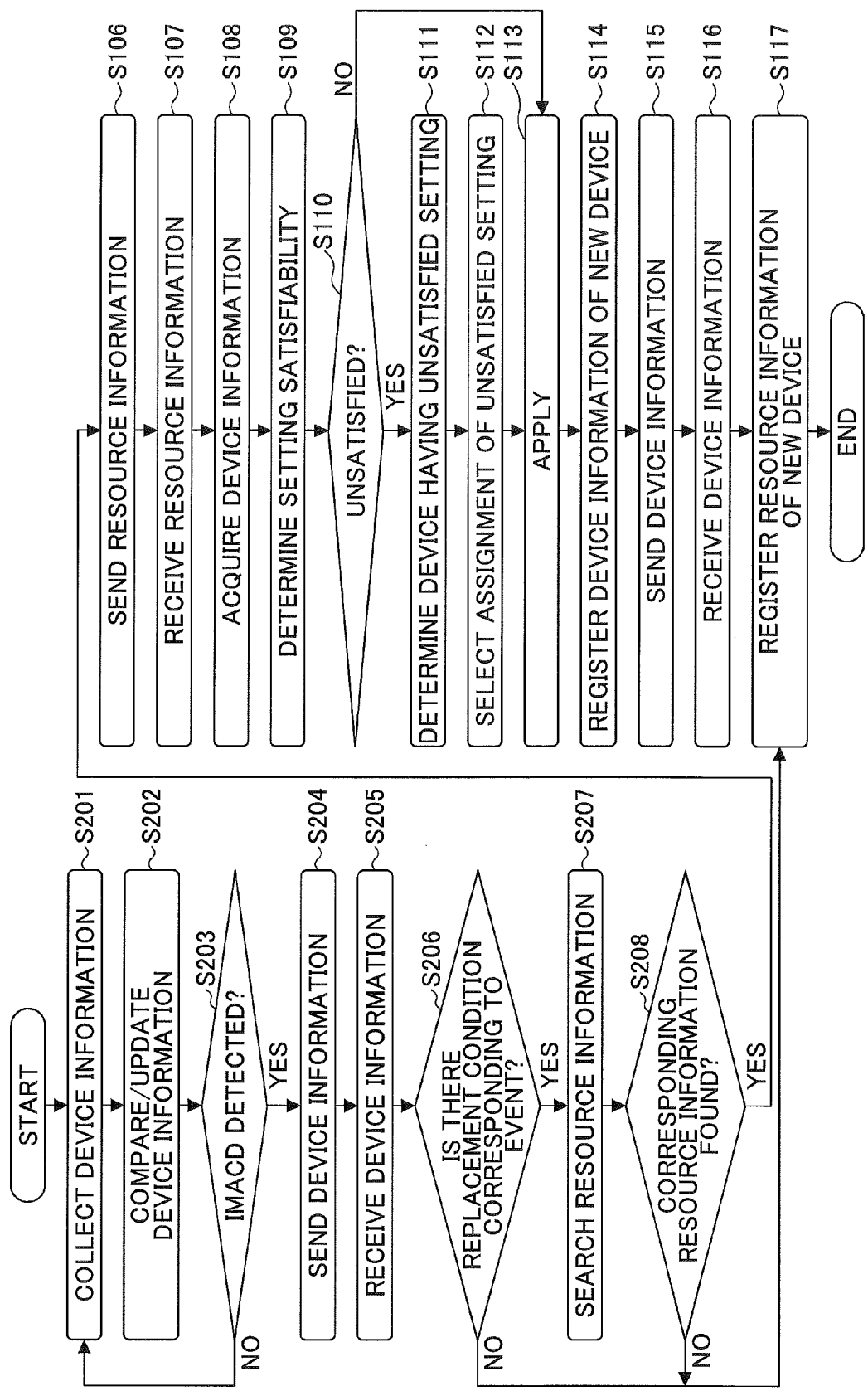
FIG. 11 is a flowchart illustrating exemplary process steps executed by a device management apparatus and a resource management apparatus in a second embodiment of the present invention.

FIG. 11 is a flowchart illustrating exemplary process steps executed by the device management apparatus 10 and the resource management apparatus 20 in the second embodiment. In FIG. 11, process steps that may be identical to those illustrated in FIG. 4 are given the same reference numerals and their descriptions are omitted.

In step S201, the device information management unit 15 of the device management apparatus 10 periodically conducts a search for the devices 30 connected to the network 50, and collects device information of each of the detected devices 30, for example. In this way, up-to-date device information of each of the devices 30 connected to the network 50 can be periodically collected.

After the device information is collected, in step S202, the device information management unit 15 compares a list of the collected device information and a list of the device information stored in the device information storage unit 17, and updates portions of the device information stored in the device information storage unit 17 that differ from the collected device information (S202). For example, if the collected device information includes additional device information that is not stored in the device information storage unit 17 (i.e., if new device information is added), the new device information is stored in the device information storage unit 17. Note that when the new device information is added, installation of a new device 30 associated with the new device information is detected. Also, if there is device information that is stored in the device information storage unit 17 but is not included in the collected device information, and the number of times or the time period over which the device information is not detected exceeds a predetermined value, this means that the device 30 associated with the undetected device information is no longer connected to the network 50. In this case, the current date/time is stored as the disposal date/time. In other words, this means that the disposal of the device 30 associated with the device information is detected. Further, if there is a difference between the collected device information and the device information stored in the device information storage unit 17 for the same device 30, the device information stored in the device information storage unit 17 is updated according to the collected device information.

Then, in step S203, the device information management unit 15 determines whether IMACD of the device 30 is detected by comparing the device information. For example, the device information management unit 15 determines whether installation of the device 30, movement of the device 30, addition of a function to the device 30, change of setting of the device 30, or disposal of the device 30 is detected.

If IMACD of the device 30 is detected (S203, YES), in step S204, the device information sending unit 16 sends the device information of the device 30 and the event (i.e., installation, movement, addition, change, or disposal) detected with respect to the device 30 to the resource management apparatus 20. In step S205, the device information receiving unit 24 of the resource management apparatus 20 receives the device information and the event. For example, the device information receiving unit 24 may receive device information of the device 30 and information indicating that the device 30 has been newly installed. Note that the information received by the device information receiving unit 24 may also include a registration request for registering resource information of the device 30 associated with the received device information.

Then, in step S206, the resource information management unit 22 of the resource management apparatus 20 determines whether there is a replacement condition corresponding to the received event. For example, when the received event is "install", the resource information management unit 22 determines whether a replacement condition having "install" set up as a trigger is stored in the auxiliary storage device.

If a corresponding replacement condition is stored (S206, YES), in step S207, the resource information management unit 22 searches the resource information storage unit 25 for resource information of a disposed device that satisfies the replacement condition based on the device information of the device associated with the event. For example, when the replacement condition is as illustrated in FIG. 10, the resource information management unit 22 searches for resource information including a value for the IP address that is the same as that included in the device information received in step S205.

If the corresponding resource information is detected (S208, YES), in step S106, the resource information management unit 22 sends a replacement request including the detected resource information of the disposed device and the device information received in step S205 (e.g., device information of the new device) to the device management apparatus 10.

Note that process steps performed after the above-described process steps may be identical to the process steps described above with reference to FIG. 4. In this way, when the new installation of a device 30 is detected, a disposed device 30 with an IP address identical to the IP address of the new device 30 may be identified, and setting information of the disposed device 30 may be applied to the new device 30.

Note that if there is no corresponding replacement condition (S206, NO), or the corresponding resource information is not detected in step S207 (S208, NO), step S117 is performed.

In step S117, resource information of the installed device is stored in the resource information storage unit 25 based on the device information of the newly installed device.

As described above, according to an aspect of the second embodiment, the device management apparatus 10 automatically detects the installation of the new device 30 and automatically applies setting information of the disposed device 30 to the new device 30. In this way, setting operations for the new device may be efficiently performed.

Also, in a case where the setting information of the disposed device 30 (pre-replacement device) cannot be satisfied by the settings of the new device 30 alone, the unsatisfied setting may be assigned to one or more other devices 30. Thus, functions available at the pre-replacement device may have an improved chance of continuing to be available even after replacement of the pre-replacement device.

Also, the disposed device 30 (pre-replacement device) is selected based on the commonality of an attribute with the new device. Thus, the disposed device 30 selected as the pre-replacement device may more likely to correspond to the actual device being replaced, for example.

Note that the distribution of the roles and functions of the device management apparatus 10 and the resource management apparatus 20 are not limited to the embodiment described above. For example, the roles and functions of the device management apparatus 10 and the resource management apparatus 20 may alternatively be implemented by an information processing system 1 as illustrated in FIG. 12. Note that the information processing system 1 of FIG. 12 may be implemented by a single computer or a combination of two or more computers.

Also, note that the device information storage unit 17 described above is an example of a storage unit. The satisfiability determining unit 12 is an example of a determining unit. The assignment selecting unit 13 is an example of a selecting unit. The device setting unit 14 is an example of an applying unit. The device information management unit 15 is an example of a detecting unit.

Although the present invention has been described above with respect to certain illustrative embodiments, the present invention is not limited to the specifically disclosed embodiments, and numerous variations and modifications may be made without departing from the spirit and scope of the present invention.

What is claimed is:

1. A device management apparatus comprising at least a processor, in communication with a memory, wherein the processor executes the steps of:
   determining whether a setting of a second device satisfies a setting of a first device by comparing information relating to the setting of the first device that is a pre-replacement device with information relating to the setting of the second device that is a replacement device;
   selecting at least one device that is capable of satisfying the setting of the first device based on information relating to a setting of the at least one device when the setting of the second device does not satisfy the setting of the first device; and
   applying a setting value set up for the setting of the first device to the at least one device that has been selected.

2. The device management apparatus as claimed in claim 1, wherein the processor further executes the steps of:
   selecting the at least one device that is capable of satisfying a first setting of the first device that is not included in the setting of the second device; and
   applying to the second device a setting value set up for a second setting of the first device that is included in the setting of the second device, and applying to the at least one device that has been selected a setting value set up for the first setting of the first device that is not included in the setting of the second device.

3. The device management apparatus as claimed in claim 1, wherein
   when the setting of the first device indicates a validity of a function, the processor further executes a step of applying the setting value set up for the setting of the first device to the at least one device that has been selected if the setting value set up for the setting of the first device indicates that the function is valid.

4. The device management apparatus as claimed in claim 1, wherein the processor further executes a step of:
   detecting an installation of a new device based on an addition of information relating to the new device;
   wherein the second device corresponds to the new device that has been detected.

5. The device management apparatus as claimed in claim 4, wherein the first device has a predetermined attribute in common with a predetermined attribute of the new device that has been detected.

6. A device management method executed by a computer including at least a processor, in communication with a memory, the device management method comprising the steps of:
   determining whether a setting of a second device satisfies a setting of a first device by comparing information relating to the setting of the first device that is a pre-replacement device with information relating to the setting of the second device that is a replacement device;
   selecting at least one device that is capable of satisfying the setting of the first device based on information relating to a setting of the at least one device when the setting of the second device does not satisfy the setting of the first device; and
   applying a setting value set up for the setting of the first device to the at least one device that has been selected.

* * * * *